Figure 1:
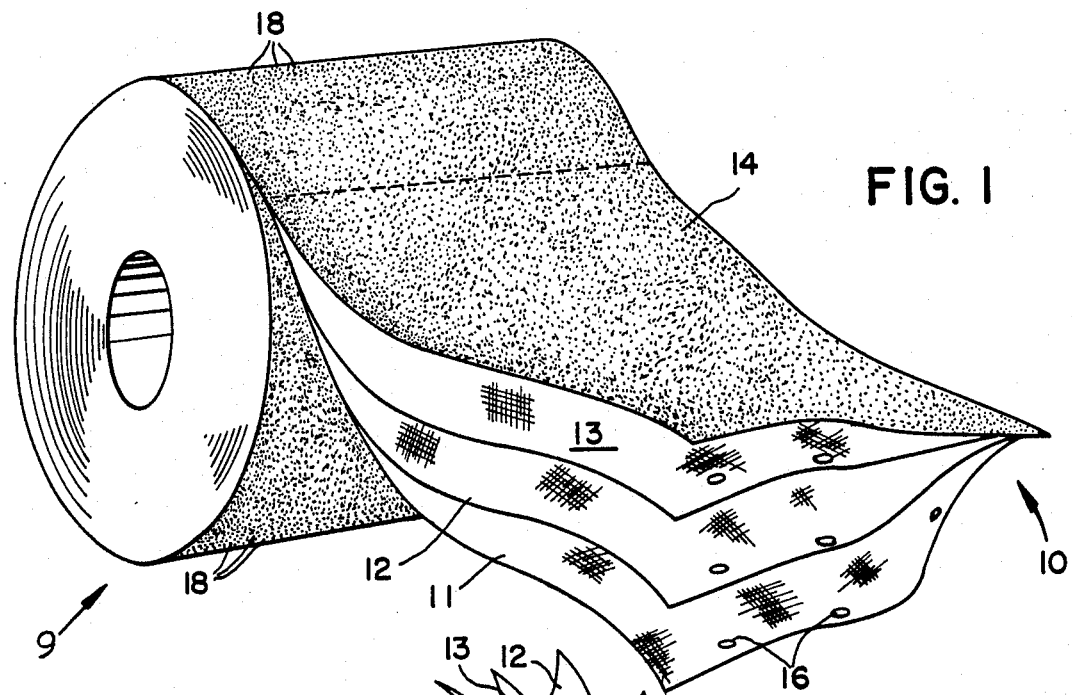

United States Patent [19]

St. Cyr

[11] Patent Number: 4,816,320

[45] Date of Patent: Mar. 28, 1989

[54] TOILET TISSUE AND FACIAL TISSUE

[76] Inventor: Napoleon St. Cyr, P.O. Box 664, Stratford, Conn. 06497

[21] Appl. No.: 874,641

[22] Filed: Jun. 16, 1986

[51] Int. Cl.⁴ ............................................. B32B 27/14
[52] U.S. Cl. ....................................... 428/198; 15/104; 15/93; 428/195; 428/206; 428/211; 428/281; 428/282; 428/283; 428/354; 428/487; 428/535; 428/913
[58] Field of Search ............... 428/283, 326, 354, 487, 428/535, 913, 327, 154, 195, 198, 206, 211, 280, 281, 282; 15/104.93, 104.94

[56] References Cited

U.S. PATENT DOCUMENTS

| | | | |
|---|---|---|---|
| Re. 29,052 | 2/1976 | Bucalo | 15/104.93 |
| 85,188 | 12/1868 | Thompson | 15/104.93 |
| 1,353,954 | 4/1920 | Henry | 15/104.93 |
| 2,969,626 | 10/1961 | Rudes | 15/104.93 |
| 2,999,265 | 6/1961 | Duane et al. | 15/506 |
| 3,017,317 | 1/1962 | Voigtman et al. | 428/535 |
| 3,264,172 | 12/1966 | Regutti | 15/104.93 |
| 3,414,459 | 12/1968 | Wells | 428/535 |
| 3,414,927 | 8/1968 | Worcester | 15/104.93 |
| 3,485,349 | 4/1969 | Chaney, Jr. | 15/104.93 |
| 3,613,142 | 11/1971 | Chaney, Jr. | 15/104.93 |
| 3,625,795 | 12/1971 | Knechtges et al. | 428/198 |
| 3,657,760 | 12/1972 | Kudisch | 15/104.93 |
| 3,737,939 | 1/1973 | Jones, Sr. | 15/104.93 |
| 3,775,801 | 3/1973 | Walker | 15/104.93 |
| 3,818,533 | 2/1974 | Scheuer | 15/104.93 |
| 3,881,210 | 1/1975 | Drach et al. | 15/104.93 |
| 4,117,187 | 7/1978 | Adams et al. | 15/104.93 |
| 4,204,532 | 5/1980 | Lind et al. | 428/198 |
| 4,397,754 | 2/1983 | Collishaw et al. | 252/91 |
| 4,426,418 | 6/1984 | Coleman et al. | 15/104.93 |
| 4,462,981 | 1/1984 | Smith | 15/104.93 |

*Primary Examiner*—James J. Bell
*Attorney, Agent, or Firm*—Mattern, Ware, Stoltz & Fressola

[57] ABSTRACT

Improved multiple-ply tissue for use as cleansing, facial or toilet tissue combines at least one and preferably two soft, absorbent layers of loosely felted cellulose fiber paper, and an overlying layer of thin, lightweight, moisture-resistant, cellulose fiber paper, with non-skid traction material overlying said moisture-resistant layer. The traction material may be a layer of cellulose-fiber paper having a roughened overlying surface, or it may be an outer coating of finely divided latex particles applied to the overlying surface of the moisture-resistant layer or to such a separate, overlying layer.

9 Claims, 1 Drawing Sheet

U.S. Patent     Mar. 28, 1989     4,816,320

TOILET TISSUE AND FACIAL TISSUE

This invention relates to improved toilet tissue and facial tissue, and particularly to multi-layer, laminated tissue presenting one, two or more front layers of soft liquid-absorbent material, backed by a traction material for convenient manual handling, preferably separated from the absorbent material by a moisture-resistant layer.

BACKGROUND ART

Conventional facial tissue and toilet tissue is normally formed of one or two layers of thin absorbent, loosely felted soft paper, and it is easily torn apart. This may require the user to fold multiple layers together to provide the desired resistance to tearing. Such tissue is flimsy, at best, and when moistened, it quickly disintegrates, often to the dismay of the user.

While toilet and facial tissue is considered a necessity and most consumers do not expect to pay luxury prices for it, there has developed an unfilled need and demand for a superior type of toilet tissue and facial tissue, having ample absorbency coupled with enhanced resistance to tearing or ripping. A need has also developed for the provision of a skid-resistant surface, minimizing sliding or skidding of the tissue in the user's hand during use. Skid-resistance allows the user to apply the tissue readily to the exact site desired, perform the absorbing or wiping operation and remove the tissue with deft precision, completing the desired use of the tissue while protecting the user's fingers against soiling.

DISCLOSURE OF THE INVENTION

The improved toilet tissue and facial tissue of the present invention supplies these needs by employing at least one and preferably two or more thin absorbent layers of loosely felted soft paper, combined with a moisture-resistant layer of thin, lightweight paper, preferably backed by a stippling, a coating or a separate layer of non-skid traction material. The layers may be lightly joined together by needling or by spaced dots of bonding adhesive, and the combined, multiple-ply improved tissue may be wound on rolls like conventional toilet tissue, or supplied in folded or interleaved-fold sheets like standard facial tissue. It may be stored in special decorative and attractive roll or sheet dispensers of suitable matching sizes for wall or undershelf mounting at convenient dispensing sites.

Accordingly, a principal object of the present invention is to provide improved types of toilet tissue and cleansing and facial tissue providing ample moisture absorbency on one side, coupled with a skid-resistant manual traction surface on the opposite side with a moisture-resistant layer interposed between the two sides of the tissue.

Another object of the invention is to provide such improved tissue fabricated in roll form for convenient storage, with segments joined to each other along weakened or perforated score lines for convenient dispensing and ready segment-separation by the user.

A further object of the invention is to provide such improved tissue fabricated in stacked, folded sheet form for convenient withdrawal from stack dispensers.

Still another object of the invention is to provide such improved tissue wherein the separate layers are lightly bonded together by needling, or by spaced bits of adhesive.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

THE DRAWINGS

Figure 2:
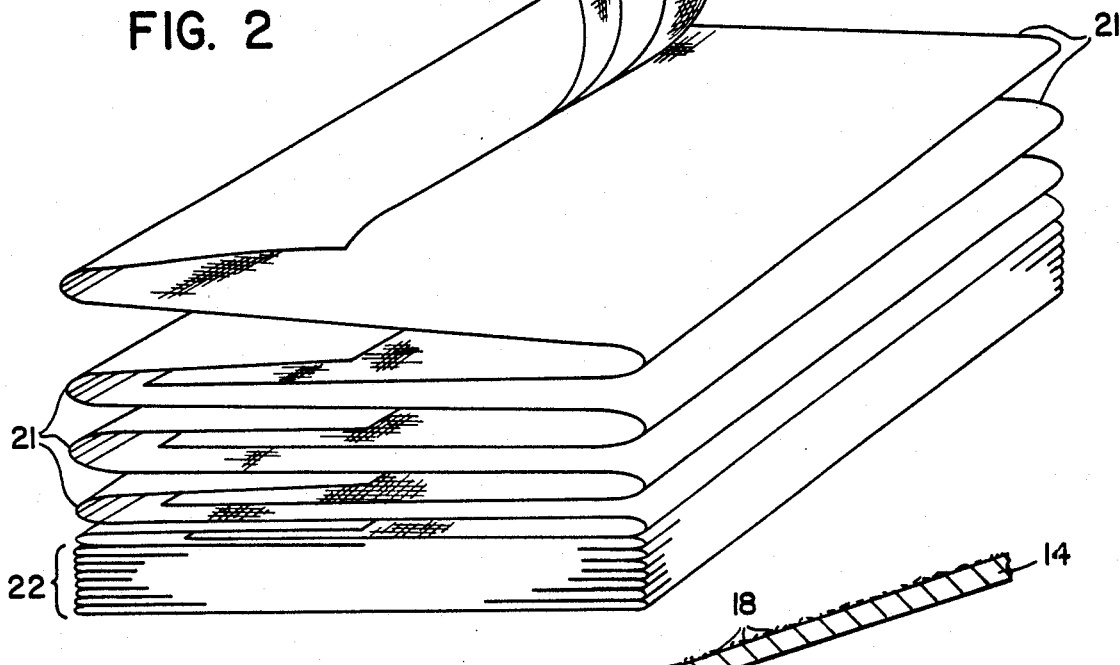
Figure 3:
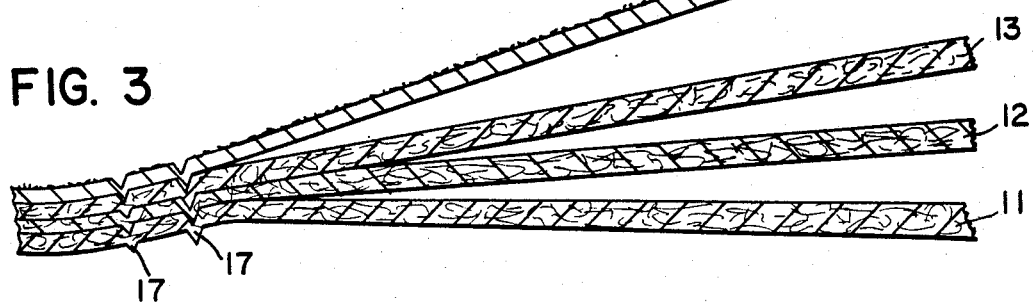

For a fuller understanding of the nature and objects of the invention, reference should be made to the following detailed description taken in connection with the accompanying drawing, in which:

FIG. 1 is a perspective view of a roll of the improved tissue of the present invention with four plies separated in the front corner foreground to illustrate the separate materials employed in the preferred embodiment of the invention;

FIG. 2 is a schematic perspective view of stacked, folded and interleaved sheets of the improved tissue of the present invention with a rear corner being illustrated with the layers fanned apart to show their relationship in each multiple ply sheet of tissue; and FIG. 3 is a greatly enlarged fragmentary cross-sectional end elevation view of a tissue sheet characterizing the preferred embodiment of the present invention illustrating the individual plies or layers and their relationship in the preferred embodiment of the invention.

BEST MODE FOR CARRYING OUT THE INVENTION

In the embodiment of the invention illustrated in FIG. 1, a roll 9 of improved tissue 10 is illustrated with its free end drawn forward for dispensing, and with its multiple plies fanned apart to illustrate the different layers of material combined to form the tissue of the present invention. The innermost layers 11 and 12 are preferably formed of cellulose fibers, loosely felted to produce extremely soft, absorbent layers.

Outside these two absorbent layers 11 and 12 is a moisture-resistant layer 13, normally also formed of cellulose fibers, like the soft, absorbent felted layers 11 and 12. The cellulose fibers employed in the moisture-resistant layer 13, however, are normally exposed to a more severe or longer beating step during the paper making process, with the result that layer 13 is more dense, crisp and translucent than the soft absorbent layers 11 and 12. In addition, moisture resistance may be contributed by a sizing of wax or resins or combinations thereof in steps well known in the paper making industry. Layer 13 should be extremely thin and light in weight, however, such as fruit wrap paper, onionskin paper or so called "glassine" paper, and it is normally much lighter than conventional, heavily sized "wax-paper." While a thin sheet of polymer film might be virtually moisture-proof, moisture degradation and eventual biodegradable destruction of toilet tissue is highly preferable. Thin, crisp, lightly sized moisture-resistant cellulose-fiber paper is thus preferred for layer 13. Overlying the layers 11, 12 and 13 is an outer layer 14 of skid-resistant paper which may be similar in weight and sizing to moisture-resistant layer 13, or may exhibit a combination of the features of layer 13 and the absorbent layers 11 and 12, making it somewhat less moisture-resistant than layer 13.

Outer traction layer 14 is characterized by its non-slip outer surface, which may be contributed by roughness of the surface texture of layer 14 itself, or may be the result of dotting or stippling the outer surface of layer 14 with fine dots or atomized droplets of adhesive material mist-sprayed thereon, as indicated by the stippling 18 shown on the outer surface of layer 14 in FIG. 1.

The layers 11, 12, 13 and 14, shown fanned apart in the foreground of FIG. 1, are normally closely juxtaposed and are preferably bonded together for use as a single, multiple-ply sheet of tissue. Bonding may be provided by dots of adhesive such as the droplets 16 shown in FIG. 1 placed between facing surfaces of the layers 11, 12, 13 and 14. Alternatively, bonding of the individual layers may be provided by conventional "needling," by which the arrayed stack of layers is passed through a needling step, normally performed by a needling wheel with sharp pointed needles protruding radially therefrom and passing through all layers of the sheet. Preferably the arrayed stack of layers 11, 12, 13 and 14, compacted tightly together in the way they are illustrated on the right-hand side of sheet 10 in FIG. 1, are drawn tautly around a portion of the periphery of the needling wheel. The needle points puncture all layers of the sheet 10. In FIG. 3, a pair of needled punctures 17 are illustrated on the left-hand side of the drawing. A row of needling along each edge of the tissue strip 10 or the tissue sheets 21 illustrated in FIG. 2 will properly bond all of the multiple plies together to form integral improved tissue sheets 10 or 21.

If desired, the traction surface formed on the outermost face of the multiple-ply tissue of the present invention may be applied directly to the outer face of moisture-resistant layer 13. For example, finely atomized droplets 18 of latex or similar elastomers having good traction properties may be delivered in mist form directly to the outer face of layer 13, to which they will adhere and dry as tiny particles providing the desired non-skid traction properties. These latex droplets 18 are illustrated in the greatly enlarged cross-sectional end elevation view of FIG. 3, where they are shown deposited on the uppermost surface of the traction layer 14, and they are also shown on the outer surface of layer 14 in FIG. 1. If desired, however, the separate outer layer 14 may be formed with a crinkled or crepe surface which itself supplies the desired traction.

Conventional toilet tissue width of 11.5 cm or about 4½ inches is acceptable, but slightly wider toilet tissue of 12.5 cm or about 5 inches is preferred by many users and a luxurious toilet tissue about 18 cm or approximately 7 inches wide is desired by some users.

The provision of individual sheets of the tissues of the present invention is illustrated in FIG. 2, where sheets 21 are shown stacked in a vertical stack 22 with the folded sheets 21 being interleaved for convenient dispensing withdrawal by the user from conventional dispenser racks or containers. As shown in the upper portion of FIG. 2, a similar array of multiple plies is preferably combined to form these interfolded tissue sheets in this embodiment of the invention. Two soft, loosely felted, absorbent layers 11 and 12 again form the highly absorbent layers providing the soft working surface of this laminated tissue. Overlying absorbent layers 11 and 12 is a moisture-resistant layer 13 formed as a thin, crisp and extremely lightweight sheet having suitable moisture-resistant sizing added during its manufacturing process. The outermost surface again comprises a traction surface of the kind previously described, which may constitute a separate non-skid layer of cellulose fiber paper, or may be merely a stippling treatment of the outer surface of layer 13 with atomized latex droplets, for instance.

Mild fragrant scent may be added to the improved tissue of this invention, further enhancing its attractiveness and desirability.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Multiple-ply dry cellulose fiber tissue suitable for contact with human skin comprising
    at least one soft, dry, moisture-absorbent layer of loosely felted cellulose fiber paper,
    a layer of dry, thin, lightweight, moisture-resistant, cellulose fiber paper overlying all said moisture-absorbent cellulose fiber paper, and
    non-skid dry traction material overlying said moisture-resistant layer suitable for non-skid contact with a hand of a user,
whereby the user can manipulate said dry tissue by grasping contact with said non-skid traction material overlying the dry moisture-resistant layer, deploying the dry tissue to soak up moisture on the user's skin in said at least one soft, moisture-absorbent layer with said moisture resistant overlying layer preventing the moisture from contacting the hand of the user.

2. The tissue defined in claim 1, including at least two soft absorbent layers adjacent to each other.

3. The tissue defined in claim 1, wherein the moisture-resistant layer is lightly sized with moisture-resistant resin.

4. The tissue defined in claim 1, wherein the moisture-resistant layer has its resistance to moisture enchanced by beating of the cellulose fiber pulp during the paper making process.

5. The multiple-ply tissue defined in claim 1, wherein the non-skid traction material is applied as a mist of atomized droplets of latex to the overlying surface of the moisture-resistant layer.

6. The multiple-ply tissue defined in claim 1, wherein the non-skid traction material comprises a separate layer of cellulose-fiber paper having a roughened overlying surface.

7. The tissue defined in claim 6 wherein the overlying roughened surface of the separate non-skid traction layer is provided with an outer coating of finely divided latex particles applied thereto.

8. The tissue defined in any of the preceding claims wherein the respective layers are bonded together by arrayed lines of needling punctures.

9. The tissue defined in claim 2, 3, 4, 6 or 7 wherein the respective layers are bonded together by local patches of adhesive applied therebetween.

* * * * *